US009555838B2

(12) United States Patent
Saje et al.

(10) Patent No.: US 9,555,838 B2
(45) Date of Patent: Jan. 31, 2017

(54) MIXED MATERIAL TUNABLE ROCKER SYSTEM

(71) Applicant: GM Global Technology Operations LLC, Detroit, MI (US)

(72) Inventors: Robert N. Saje, Shelby Township, MI (US); Terry A. Swartzell, Ann Arbor, MI (US); Robert M. Kielbik, Chesterfield Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/287,501

(22) Filed: May 27, 2014

(65) Prior Publication Data

US 2015/0001892 A1 Jan. 1, 2015

Related U.S. Application Data

(60) Provisional application No. 61/840,941, filed on Jun. 28, 2013.

(51) Int. Cl.

*B62D 25/00* (2006.01)
*B62D 25/20* (2006.01)
*B62D 25/02* (2006.01)

(52) U.S. Cl.

CPC ......... *B62D 25/2036* (2013.01); *B62D 25/025* (2013.01)

(58) Field of Classification Search

CPC .......................... B62D 25/025; B62D 25/2036
USPC .......................................................... 296/209
See application file for complete search history.

(56) References Cited

U.S. PATENT DOCUMENTS 8,857,040 B2 * 10/2014 Freis ......................... F16B 5/02 29/525.11
2010/0109385 A1 * 5/2010 Yamada et al. ............... 296/209
2012/0280534 A1 * 11/2012 Eipper ..................... 296/187.01

FOREIGN PATENT DOCUMENTS

| | | | | |
|---|---|---|---|---|
| CN | 1314277 A | | 9/2001 | |
| CN | 1835815 A | | 9/2006 | |
| CN | 2813409 Y | | 9/2006 | |
| DE | 102006006680 A1 | | 8/2007 | |
| DE | 102009015157 A1 | | 9/2010 | |
| DE | 102013201265 | * | 8/2013 | ................ F16B 5/02 |
| JP | H10278840 A | | 10/1998 | |

OTHER PUBLICATIONS

Chinese Office Action dated Feb. 3, 2016 ; Application No. 201410295180.0; Applicant: GM Global Technology Operations LLC.; 6 pages.
German Office Action dated Jun. 23, 2016; Application No. 10 2014 108 880.8 ; Applicant: GM Global Technology Operations LLC.; 4 pages.

* cited by examiner

*Primary Examiner* — Joseph D Pape
(74) *Attorney, Agent, or Firm* — BrooksGroup

(57) ABSTRACT

A number of variations may include a rocker system using tunable parts to satisfy a number of load cases. A number of variations may include a rocker system including a vehicle rocker and at least one reinforcement attached to a first side wall or a corner of the rocker.

10 Claims, 6 Drawing Sheets

10 36 38 34 40 24 26 15 14 26 20 48 46 42 48 32

MIXED MATERIAL TUNABLE ROCKER SYSTEM

CROSS-REFERENCE TO RELATED APPLICATIONS

This application claims the benefit of U.S. Provisional Application No. 61/840,941 filed Jun. 28, 2013.

TECHNICAL FIELD

The field to which the disclosure generally relates to includes vehicle rocker systems.

BACKGROUND

Vehicles may be equipped with rockers.

SUMMARY OF ILLUSTRATIVE VARIATIONS

A number of variations may include a rocker system using tunable parts to satisfy a number of load cases.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

According to a number of variations, optimum mass efficiency within a rocker system can be achieved by utilizing tunable parts to satisfy variations in specific load cases. Tunable/local reinforcements of different materials, grades of materials, lengths and thicknesses can be joined to a lightweight aluminum rocker extrusion or stamped assembly by varying joining methods such as attaching the reinforcement with structural adhesives and/or flow drill screws, or spot or mig welding.

Figure 1:
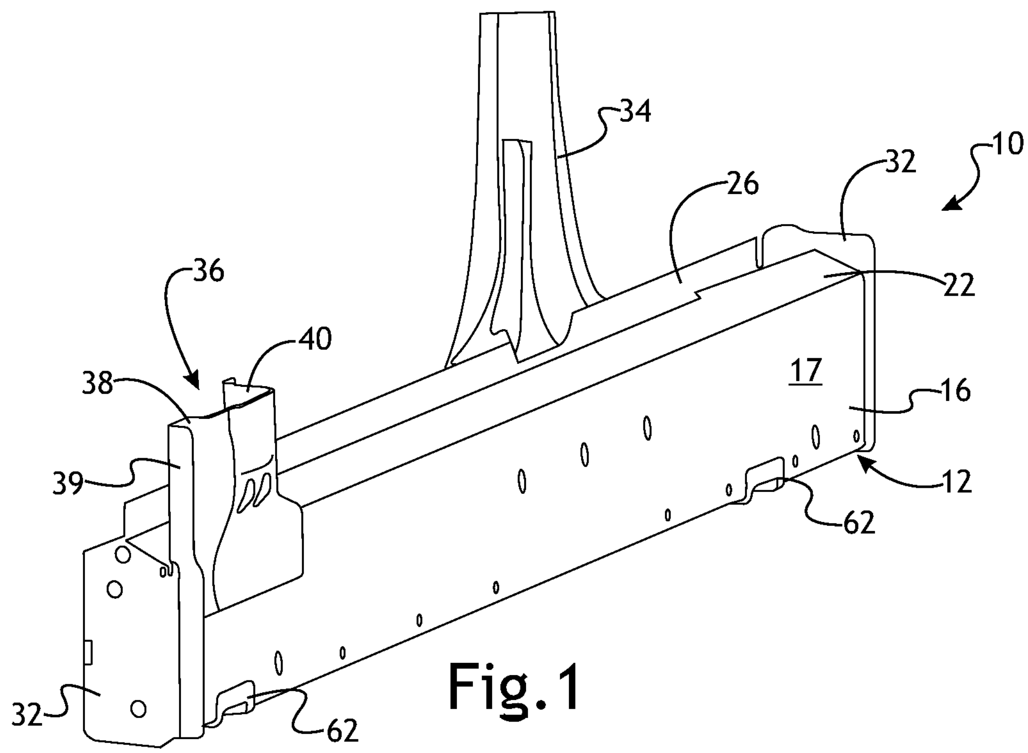
FIG. 1 is a perspective view of a product including a rocker viewed from the outboard side of the rocker according to a number of variations.
Figure 2:
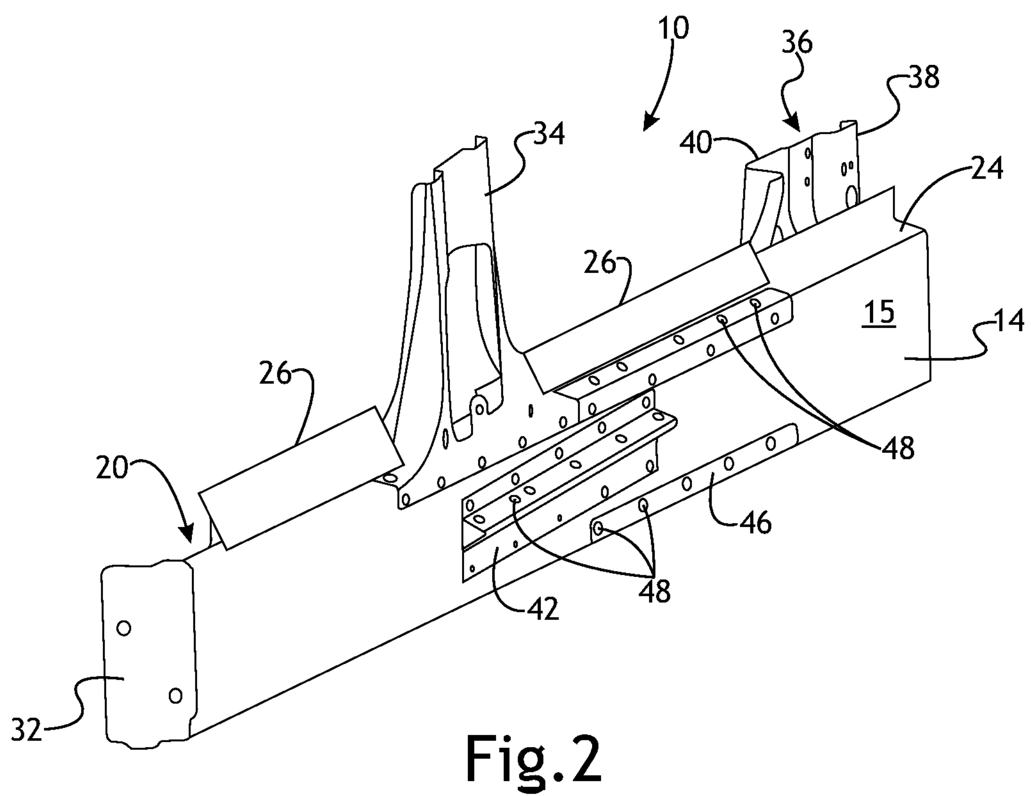
FIG. 2 is a perspective view of a rocker system viewed from the inboard side of the rocker according to a number of variations.
Figure 3:
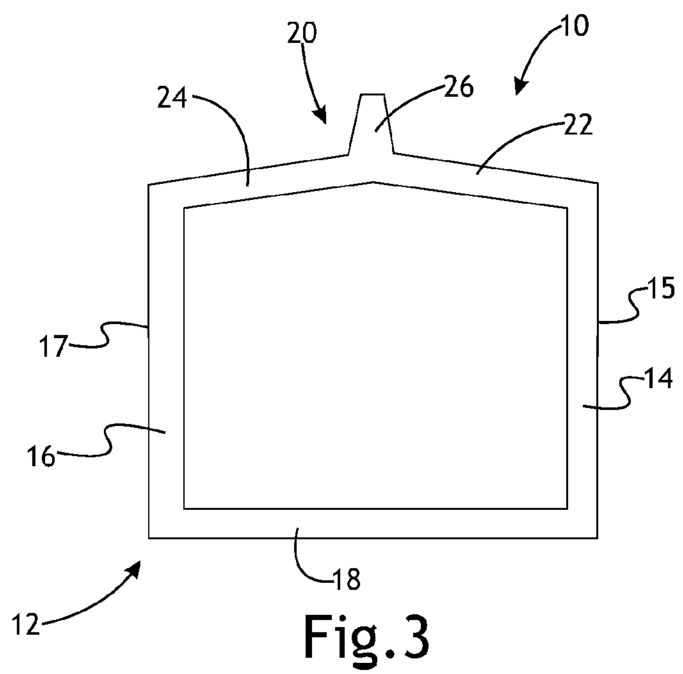
FIG. 3 is a sectional view of a rocker according to a number of variations.
Figure 4:
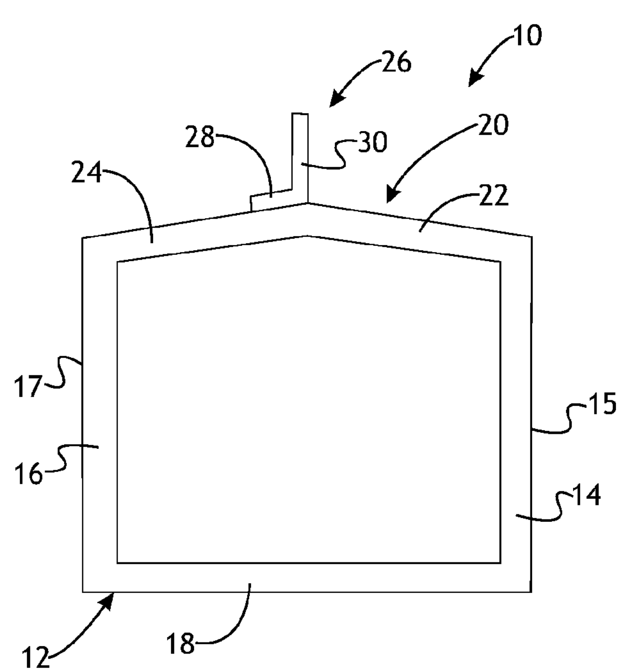
FIG. 4 is a sectional view of a rocker according to a number of other variations.

Referring now to FIGS. 1-4, a number of variations may include a product 10 including a rocker system including a rocker 12. In a number of variations, for example as illustrated in FIG. 3, the rocker 12 may include a first side wall 14 which may be an inboard side wall, an opposite second side wall 16 which may be an outboard side wall, a bottom wall 18 and a top wall 20. In a number of variations the top wall 12 may be planar or the top wall 20 may include a first segment 22 extending from the front wall 14 and a second segment 14 extending from the second side wall 16 and wherein the first segment 22 and second segment 24 form an obtuse angle. A flange 26 may be an integral portion of the rocker 12 particularly if the rocker is made from an extruded material such as, but not limited to, an aluminum alloy. As shown in FIG. 4, and in a number of other variations, a flange 26 may be attached to the top wall 20. In a number of variations the flange 26 may comprise steel and may include a first leg 28 and a second leg 30. In a number of variations the flange 26 may have an L shape or a lazy L shape. The flange 26 may be attached to the rocker 12 by any of a variety of means including adhesives, fasteners, such as flow drill screws. Where the flange 26 is steel, a number of through holes may be provided in the first leg 28 through which fasteners may be extended and driven into the top wall 20 of the rocker 12. In a number of other variations, a flange 26 may be attached to the rocker wherein the flange comprises aluminum and may be welded to the rocker 12, for example, using a metal inert gas (mid) process. In yet another number of variations the rocker 12 may be a stamped assembly.

Referring again to FIG. 1, end plates 32 may be secured to opposite ends of the rocker 12. The end plates 32, in a number of variations, may include aluminum and may be welded to the ends of the rocker 12. A front hinge pillar stub pillar 36 may be provided at one end of the rocker 12. The front hinge pillar stub pillar 36 may be a single piece or may be made from two or more pieces. In a number of variations, the front hinge pillar stub pillar 36 may include a front piece 38 which may include steel and a rear piece 40 which may include aluminum. The front piece 38 may include a lip 39 extending across a portion of the end of the rocker in the outboard direction. The rocker 12 may also have hoist pad 62 attached thereto. A middle pillar stub 34 may be attached to the rocker 12. The number of variations the middle pillar stub 34 may comprise steel.

Referring now to FIG. 2, in a number of variations, the first wall 14 may include a first face 15 which may be an inboard face of the rocker 12. A rocker side reinforcement 42 may be attached to the first face 15 of the first wall 14. The rocker side reinforcement 42, in a number of variations, may be an extrusion including aluminum alloy. The rocker side reinforcement 42 may be attached to the rocker 12 utilizing a plurality of fasteners 48 which may be the flow drill screws. In a number of other variations, the rocker side reinforcement 42 may comprise steel and may be attached to the first face 15 of the first wall 14 by an adhesive and flow drill screws extending through through holes formed in the rocker side reinforcement 42. The rocker system may include a first L channel reinforcement 44 placed over a corner formed by the first wall 14 and the top wall 20. A second L channel reinforcement 46 may be attached to the rocker 12 at a lower corner where the first wall 14 meets the bottom wall 14.

Figure 5:
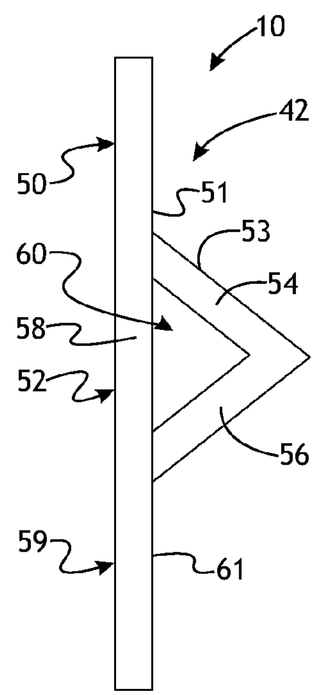
FIG. 5 is a sectional view of a rocker side reinforcement according to a number of variations.

Referring now to FIG. 5, in a number of variations the rocker side reinforcement 42 may include a first section having a first planar surface 51, a second section 52 connected to the first section 50, and a third section 59 having a planar surface 61. The second section 52 may include a first wall 54 having a planar surface 53. The first planar surface 51 and the planar face 53 may form an obtuse angle. A second wall 56 may be connected to the first wall and a base wall 59 may be connected to the first wall 54 and second wall 56 of the second section 52. The second section 52 may form a pocket 60 constructed and arranged to receive a portion of the shaft and a pointed end of a fastener such as a flow drill screw.

Figure 6:
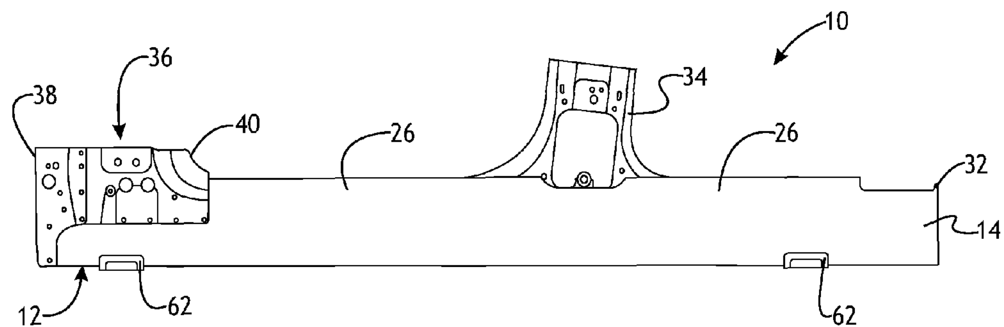
FIG. 6 is a side view of a rocker system including a front hinge pillar stub pillar including different materials according to a number of variations.

FIG. 6 is a side view of a rocker system including a front hinge pillar stub pillar 36 including different materials such as a front piece 38 including steel and a rear piece 40 including an aluminum alloy attached to the first wall 14 of the rocker 12 according to a number of variations. The front piece 38 and the rear piece 40 of the front hinge pillar stub pillar 36 may be attached to the rocker 12 using an adhesive and/or flow drill screws, or mig welds as appropriate.

Figure 7:
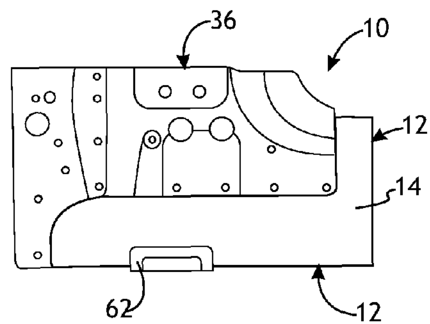
FIG. 7 is a partial side view of a rocker system including a front hinge pillar stub pillar including aluminum according to a number of variations.

FIG. 7 is a partial view of a rocker system including a front hinge pillar stub pillar 36 which may be a single piece including aluminum according to a number of variations. The front hinge pillar stub pillar 36 may be attached to the rocker 12 using an adhesive and/or flow drill screws, or mig welds.

Figure 8:
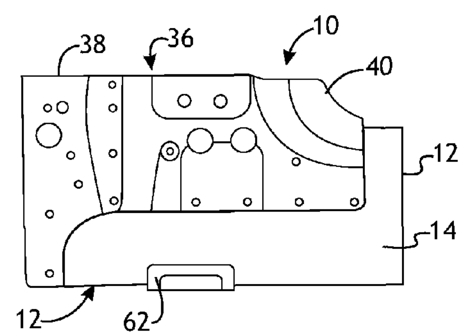
FIG. 8 is a partial side view of a rocker system including a front hinge pillar stub pillar including two different materials according to a number of variations.

FIG. 8 is a partial view of a rocker system including a front hinge pillar stub pillar 36 including two different materials 38, 40 according to a number of variations.

Figure 9:
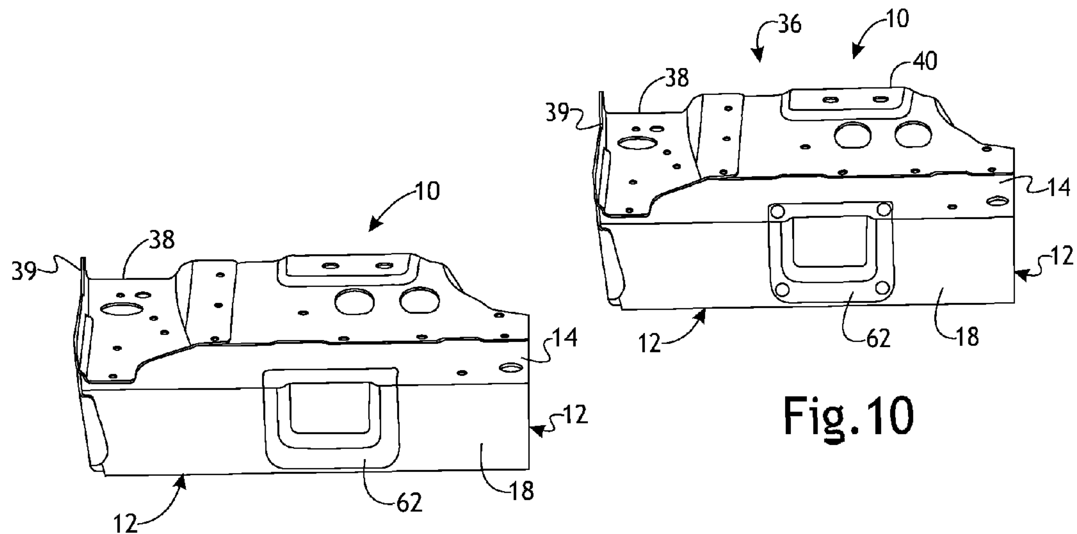
FIG. 9 is a partial perspective view viewed from the outboard side looking up of a rocker system including a front hinge pillar stub pillar including two different materials and a hoist pad including aluminum according to a number of variations.

FIG. 9 is a perspective view viewed from the outboard side looking up of a rocker system including a front hinge pillar stub pillar 36 including two different materials 38, 40 and a hoist pad 62 including aluminum according to a number of variations. The aluminum hoist pad 62 may be attached to the rocker 12 using mig welding or an adhesive and/or flow drill screws.

Figure 10:
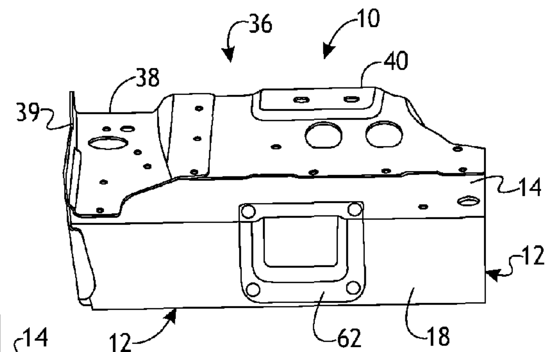
FIG. 10 is a partial perspective view from the outboard side looking up of a rocker system including a front hinge pillar stub pillar including two different materials, and a hoist pad comprising steel according to a number of variations.

FIG. 10 is a perspective view from the outboard side looking up of a rocker system including a front hinge pillar stub pillar 36 including two different materials 38, 40, and a hoist pad 62 comprising steel according to a number of variations. The steel hoist pad 62 may be attached to the rocker 12 using mig welding or an adhesive and/or flow drill screws.

Figure 11:
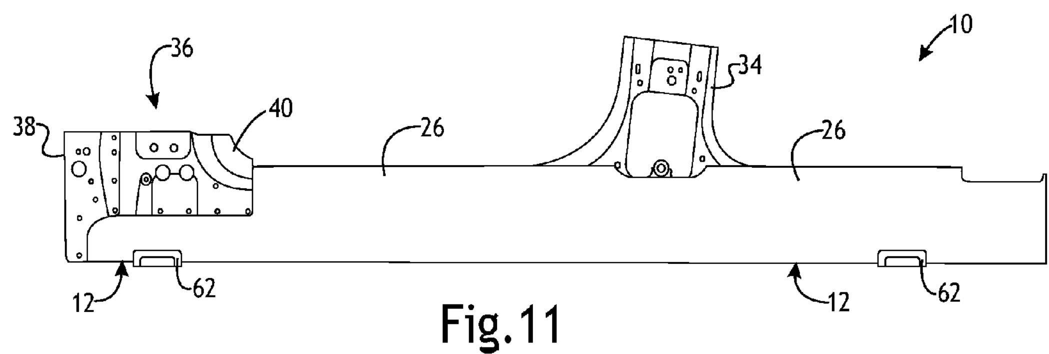
FIG. 11 is a side view of a rocker system including a rocker having aluminum extruded flanges according to a number of variations.

FIG. 11 is a side view of a rocker system including a rocker 12 having aluminum extruded flanges 26 according to a number of variations.

Figure 12:
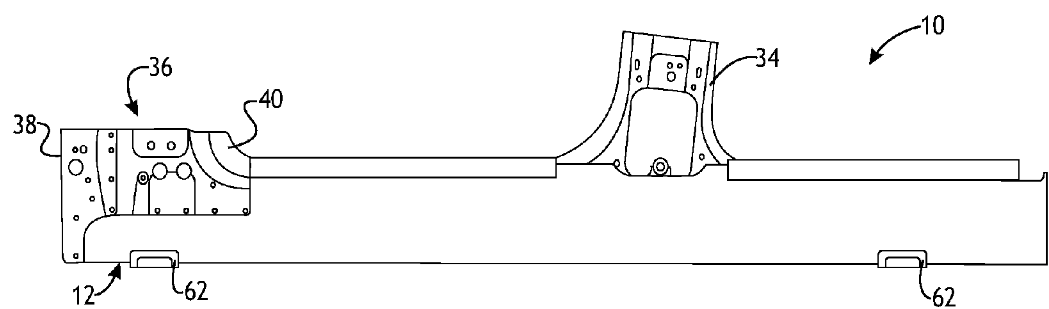
FIG. 12 is a side view of a rocker system including steel flanges attached to a rocker according to a number of variations.

FIG. 12 is a side view of a rocker system including steel flanges 26 attached to a rocker 12 according to a number of variations. The steel flanges 26 may be attached to the rocker 12 using an adhesive and/or flow drill screws.

Figure 13:
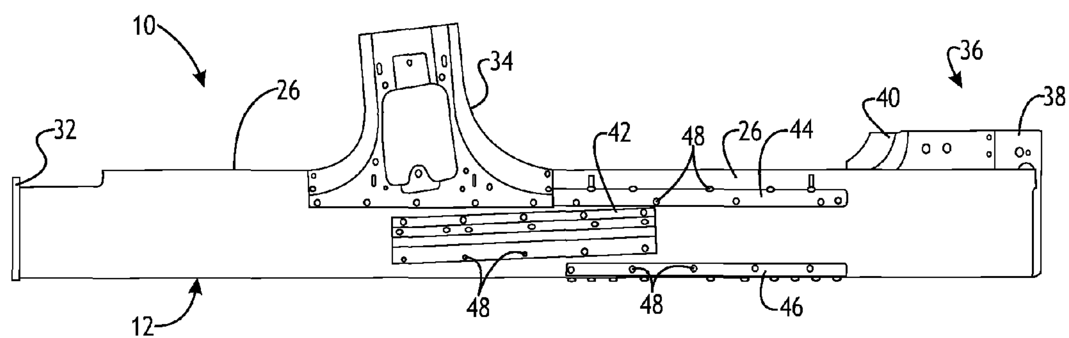
FIG. 13 is a side view of a rocker system including corner reinforcements including aluminum for the rocker according to a number of variations.

FIG. 13 is a side view of a rocker system including corner reinforcements 44, 46 including aluminum attached to the rocker 12 according to a number of variations. The corner reinforcements 44, 46 may be attached to the rocker 12 using an adhesive and/or flow drill screws, or mig welds. The addition of corner reinforcements 44, 46 eliminates the need to extrude thicker sections along the entire length of the corners of the rocker 12 thereby reducing mass.

Figure 14:
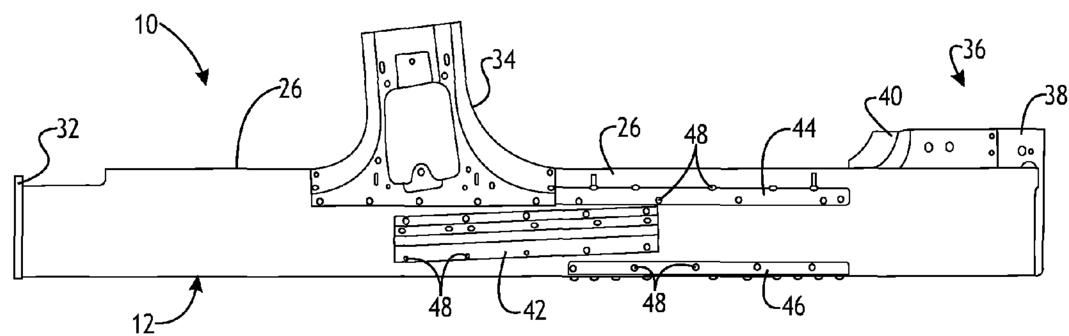
FIG. 14 is a side view of a rocker system including corner reinforcements including steel for a rocker according to a number of variations.

FIG. 14 is a side view of a rocker system including corner reinforcements 44, 46 including steel attached to a rocker 12 according to a number of variations. The steel reinforcements 44, 46 may be attached to the rocker 12 using an adhesive and/or flow drill screws. Through holes may be provided in the steel reinforcements 44, 46 so that flow drill screws may be inserted therethrough and driven into the rocker 12.

Figure 15:
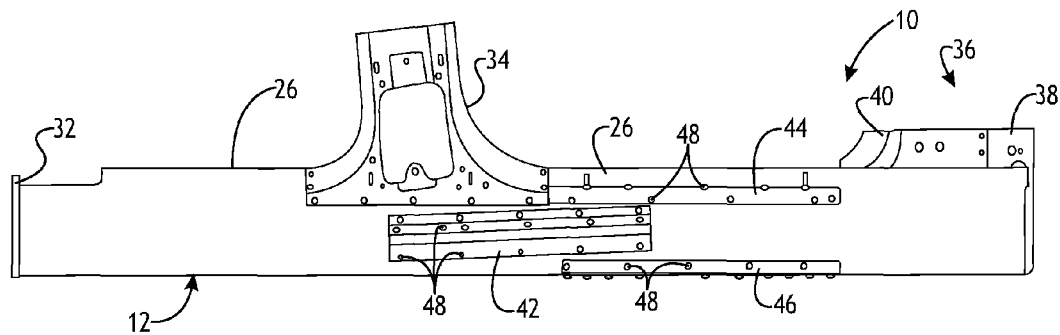
FIG. 15 is a side view of a rocker system including a rocker side reinforcement including aluminum according to a number of variations.

FIG. 15 is a side view of a rocker system including a rocker side reinforcement 42 including aluminum attached to a rocker 12 according to a number of variations. The aluminum rocker side reinforcement 42 may be attached to the rocker 12 using an adhesive and/or flow drill screws, or mig welds. The addition of a rocker side reinforcement 42 eliminates the need to extrude additional thickness areas along the entire length of the rocker extrusion 12.

Figure 16:
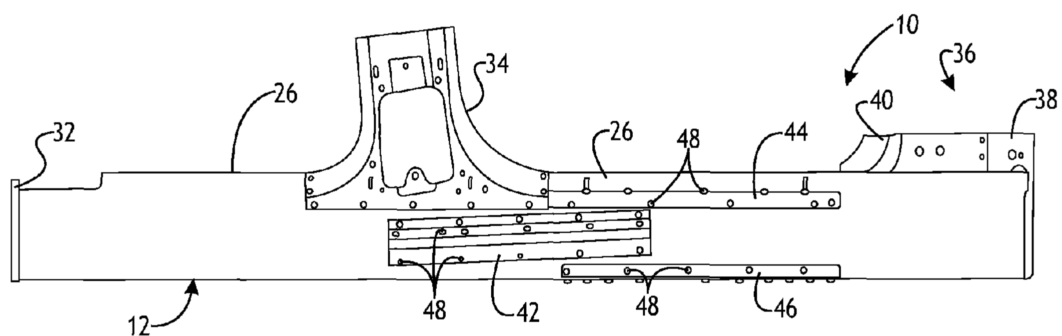
FIG. 16 is a side view of a rocker system including a rocker side reinforcement including steel according to a number of variations.

FIG. 16 is a side view of a rocker system including a rocker side reinforcement 42 including steel according to a number of variations. The steel rocker side reinforcement 42 may be attached to the rocker 12 using an adhesive and/or flow drill screws. Through holes may be provided and the rocker side reinforcement 42 through which the flow drill screws may be inserted therethrough and driven into the rocker extrusion 12.

According to a number of variations, optimum mass efficiency within a rocker system can be achieved by utilizing tunable parts to satisfy variations in specific load cases. Tunable/local reinforcements of different materials, grades of materials, lengths and thicknesses can be joined to a lightweight aluminum rocker extrusion or stamped assembly by varying joining methods such as attaching the reinforcement with structural adhesives and/or flow drill screws, or spot or mig welding.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a vehicle rocker and at least one reinforcement attached to a first side wall or a corner of the rocker.

Variation 2 may include a product as set forth in Variation 1 wherein the at least one reinforcement comprises a rocker side reinforcement attached to a side wall of the rocker.

Variation 3 may include a product as set forth in any of Variations 1-2 wherein the at least one reinforcement comprises a L channel attached to a corner of the rocker.

Variation 4 may include a product as set forth in any of Variations 1-3 wherein the at least one reinforcement comprises a rocker side reinforcement including a pocket structure defined therein.

Variation 5 may include a product as set forth in any of Variations 1-4 wherein the rocker includes the first side wall, an opposite second side wall, a bottom wall, and a top wall, and wherein the at least one reinforcement includes an L-shaped channel attached to a corner of the top wall and the first side wall.

Variation 6 may include a product as set forth in any of Variations 1-5 wherein the rocker includes the first side wall, an opposite second side wall, a bottom wall, and a top wall, and wherein the at least one reinforcement includes an L-shaped channel attached to a corner of the bottom wall and the first side wall.

Variation 7 may include a product as set forth in any of Variations 1-6 wherein the at least one reinforcement comprises an extrusion comprising an aluminum alloy.

Variation 8 may include a product as set forth in any of Variations 1-7 wherein the at least one reinforcement comprises a rocker side reinforcement having a pocket formed therein, wherein the rocker side reinforcement is an extrusion.

Variation 9 may include a product as set forth in any of Variations 1-8 wherein the at least one reinforcement comprises an L channel comprising steel.

Variation 10 may include a product as set forth in any of Variations 1-9 wherein the at least one reinforcement comprises an L channel comprising aluminum alloy.

Variation 11 may include a product comprising: a vehicle rocker and a front hinge pillar stub pillar connected to the rocker near a first end thereof.

Variation 12 may include a product as set forth in Variation 11 wherein the front hinge pillar stub pillar comprises a single piece.

Variation 13 may include a product as set forth in Variation 12 wherein the single piece comprises aluminum.

Variation 14 may include a product as set forth in any of Variation 11-12 wherein the front hinge pillar stub pillar comprises a front piece and a rear piece, the front piece being attached to the rocker nearest an end of the rocker and the rear piece be attached to the rocker adjacent and behind the front piece.

Variation 15 may include a product as set forth in Variation 14 wherein the front piece comprises steel and wherein the rear piece comprises an aluminum alloy.

Variation 16 may include a product comprising: a vehicle rocker and a middle pillar stub comprising steel attached to the rocker.

Variation 17 may include a product as set forth in Variation 16 wherein the middle pillar stub is attached to the rocker by a plurality of flow drill screws.

Variation 18 may include a product comprising: a vehicle rocker including a first side wall, an opposite second side wall, and a top wall extending between the first side wall and second side wall, and at least one flange attached to the top sidewall.

Variation 19 may include a product as set forth in Variation 18 wherein the at least one flange is attached to the top wall by a plurality of flow drill screws.

Variation 20 may include a product as set forth in Variation 19 wherein the at least one flange is attached to the top wall by an adhesive.

The above description of select variations within the scope of the invention is merely illustrative in nature and, thus, variations or variants thereof are not to be regarded as a departure from the spirit and scope of the invention.

What is claimed is:

1. A product comprising:

a vehicle rocker and at least one reinforcement comprising a metal attached to a first side wall or a corner of the rocker, and a flow drill screw extending through the at least one reinforcement and a portion of the rocker; and wherein the at least one reinforcement comprises a rocker side reinforcement including a first section having a first planar surface, a second section connected to the first section, and a third section having a planar surface, the second section including a first wall having a planar surface, the first planar surface and the third planar surface form an obtuse angle, and a second wall connected to the first wall.

2. A product as set forth in claim 1 wherein the at least one reinforcement comprises a rocker side reinforcement attached to the first side wall of the rocker.

3. A product comprising:

a vehicle rocker and at least one reinforcement comprising an extrusion comprising an aluminum alloy attached to a first side wall or a corner of the rocker, wherein the at least one reinforcement comprises a L channel attached to a corner of the rocker.

4. A product comprising:

a vehicle rocker and at least one reinforcement attached to a first side wall or a corner of the rocker, wherein the at least one reinforcement comprises a rocker side reinforcement including a first section having a first planar surface, a second section connected to the first section, and a third section having a planar surface, the second section including a first wall having a planar surface, the first planar surface and the third planar surface form an obtuse angle, a second wall connected to the first wall and a base wall connected to the first wall and the second wall the second section forming a pocket constructed and arranged to receive a portion of a shaft and a pointed end of a fastener.

5. A product as set forth in claim 1 wherein the rocker includes the first side wall, an opposite second side wall, a bottom wall, and a top wall, and wherein the at least one reinforcement includes an L-shaped channel attached to a corner of the bottom wall and the first side wall.

6. A product as set forth in claim 1 wherein the at least one reinforcement comprises an extrusion comprising an aluminum alloy.

7. A product as set forth in claim 1 wherein the at least one reinforcement comprises a rocker side reinforcement having a pocket formed therein, wherein the rocker side reinforcement is an extrusion.

8. A product as set forth in claim 1 wherein the at least one reinforcement comprises an L channel comprising steel.

9. A product as set forth in claim 1 wherein the at least one reinforcement comprises an L channel comprising aluminum alloy.

10. A product as set forth in claim 4 further comprising a flow drill screw, the flow drill screw having shaft and a pointed end, and wherein a portion of the shaft and a pointed end are received in the pocket.

* * * * *